US010059277B2

(12) United States Patent
Ackeret et al.

(10) Patent No.: US 10,059,277 B2
(45) Date of Patent: Aug. 28, 2018

(54) SECURING DEVICE FOR REMOVABLY ATTACHING A DEVICE TO TWO MUTUALLY SPACED HEAD SUPPORT RODS OF A MOTOR VEHICLE SEAT

(71) Applicant: Kinetix AG, Glarus (CH)

(72) Inventors: Peter Ackeret, Zurich (CH); Michael Andreas Keller, Freudenstadt (DE)

(73) Assignee: KINETIX AG, Glarus (CH)

( * ) Notice: Subject to any disclaimer, the term of this patent is extended or adjusted under 35 U.S.C. 154(b) by 0 days.

(21) Appl. No.: 15/113,229

(22) PCT Filed: Jan. 21, 2015

(86) PCT No.: PCT/EP2015/051134
§ 371 (c)(1),
(2) Date: Jul. 21, 2016

(87) PCT Pub. No.: WO2015/110468
PCT Pub. Date: Jul. 30, 2015

(65) Prior Publication Data
US 2017/0001575 A1 Jan. 5, 2017

(30) Foreign Application Priority Data
Jan. 21, 2014 (CH) .......................................... 87/14

(51) Int. Cl.
*B60R 11/00* (2006.01)

(52) U.S. Cl.
CPC ......... *B60R 11/00* (2013.01); *B60R 2011/005* (2013.01); *B60R 2011/0017* (2013.01);
(Continued)

(58) Field of Classification Search
CPC ............. B60R 2011/0017; B60R 7/043; B60R 2011/0059; B60N 2002/4405
(Continued)

(56) References Cited

U.S. PATENT DOCUMENTS 2,902,592 A * 9/1959 Cole ....................... A47L 9/322
15/144.4
8,516,667 B2 * 8/2013 Virgen ............... A44B 11/2515
24/641

(Continued)

FOREIGN PATENT DOCUMENTS

CN 102247035 11/2011
DE 102009030895 * 2/2010
(Continued)

OTHER PUBLICATIONS

Office Action for Chinese Patent Application 201580005393.8 dated Jan. 12, 2018.

*Primary Examiner* — Adam Waggenspack
(74) *Attorney, Agent, or Firm* — Volpe and Koenig, P.C.

(57) ABSTRACT

A securing device for removably attaching a device to two mutually spaced head support rods (1a, 1b) of a motor vehicle seat (1), having a receiving bushing (3e) for receiving a plug element (2a) which is arranged on the device (2) and having a first and a second securing element (3, 3', 4, 4') with which the receiving bushing (3e) can be secured on the head support rods (1a, 1b). The first and the second securing element (3, 3', 4, 4') are formed on opposing sides for arranging on the head support rods (1a, 1b), and connectors (5, 5a, 5b) are provided for reciprocally connecting the securing elements (3, 3', 4, 4'), wherein sliding elements (6a, 6b) are arranged between the securing elements (3, 3', 4, 4') and the head support rods (1a, 1b).

14 Claims, 3 Drawing Sheets

(52) U.S. Cl.
CPC ............... *B60R 2011/0059* (2013.01); *B60R 2011/0078* (2013.01); *B60R 2011/0094* (2013.01)

(58) Field of Classification Search
USPC .......................................... 224/275
See application file for complete search history.

(56) References Cited

U.S. PATENT DOCUMENTS

| | | | |
|---|---|---|---|
| 8,851,345 B2 | 10/2014 | Ackeret et al. | |
| 2010/0254756 A1* | 10/2010 | Chiang | B62K 19/36 403/373 |
| 2011/0155873 A1* | 6/2011 | Montag | B60R 11/02 248/218.4 |
| 2011/0283493 A1 | 11/2011 | Virgen | |
| 2012/0286008 A1 | 11/2012 | Ackeret et al. | |
| 2013/0200119 A1 | 8/2013 | Ackeret et al. | |

FOREIGN PATENT DOCUMENTS

| | | |
|---|---|---|
| EP | 2499026 | 9/2013 |
| GB | 2448958 | 11/2008 |

\* cited by examiner ic # SECURING DEVICE FOR REMOVABLY ATTACHING A DEVICE TO TWO MUTUALLY SPACED HEAD SUPPORT RODS OF A MOTOR VEHICLE SEAT

BACKGROUND

The invention relates to a securing device for removably attaching a device, such as, for example, a coat hanger, a device for hanging up objects, a table, a monitor and the like, to two mutually spaced head support rods of a motor vehicle seat.

Such a securing device has been described by the applicant in DE 10 2009 030 895, to which reference is made.

The securing device described there comprises a receiving bushing, which is arranged approximately centrally between the two head support rods, for receiving a plug element arranged on the device and a manually releasable locking device which locks the plug element in the receiving bushing, and also first and second securing elements with which the receiving bushing can be secured on the head support rods, wherein the first and the second securing element bear on two opposite sides against the head support rods and are prestressed against the head support rods by connecting means—preferably screw connections.

Although a stable securing of the device on the head support rods is achieved by the securing device described, the securing device which is connected fixedly to the head support rods may nevertheless obstruct or even block lowering of the head support, which may put the safety of the individuals on the corresponding motor vehicle seat at risk.

SUMMARY

It is the object of the present invention to provide a securing device for removably attaching a device to two mutually spaced head support rods of a motor vehicle seat, which securing device ensures that the device is stably secured to the head support rods without restricting the adjustability of the head support.

This object is achieved according to the invention by a securing device for removably attaching a device to two mutually spaced head support rods of a motor vehicle seat having one or more features of the invention. Further developments of the invention are defined below and in the claims.

According to the invention, it is possible in particular that, when securing elements are arranged on the head support rods, the sliding elements are acted upon against the head support rods via the securing elements in such a manner that, firstly, the securing device is held in its position on the head support rods and, secondly, a manual or electric motor displacement of the securing device along the head support rods is made possible. The securing elements can therefore act against the sliding elements in order to provide a holding force, wherein the sliding elements are then acted upon against the head support rods with the holding force. The holding force and the coefficient of friction between the sliding elements and the head support rods can preferably be selected here in such a manner that, firstly, the securing device is held in a slip-proof manner in its vertical position on the head support rods and, secondly, nevertheless manual or electric motor displacement of the securing device in the direction of the longitudinal axis of the head support rods, i.e. in the vertical direction, is made possible.

The securing elements can act directly or indirectly against the sliding elements; within the scope of the invention, in particular also intermediate elements can be provided between the securing elements and the sliding elements. Said intermediate elements can be, for example, spring elements for supporting and/or providing the holding force.

By providing the sliding elements between the two securing elements and the head support rods, both a stable connection and the vertical displaceability of the securing device on the head support rods are ensured.

Advantageous refinements of the invention can be produced in particular in that the two securing elements extend in the transverse direction to the head support rods beyond the head support rods and two sliding elements are arranged on each securing element;

in that the sliding surfaces of the sliding elements, which sliding surfaces are directed toward the head support rods, engage around the head support rods by approximately half;

in that the sliding surfaces of the sliding elements have a semi-circular cross section;

in that the sliding surfaces of in each case two sliding elements which are directed toward each other jointly surround the head support rods in a tubular manner;

in that the sliding elements are inserted as separate components into the securing elements;

in that for adaptation to different distances between the head support rods, the sliding elements are mounted in the securing elements so as to be movable parallel to a horizontal connecting line between the two head support rods;

in that the sliding elements are guided in longitudinal guides in the securing elements;

in that the screw connections are arranged between the receiving bushing and the sliding elements;

in that stops are provided which support the two securing elements against each other during the screwing together in such a manner that no forces which block the running of the sliding elements on the head support rods act on the sliding elements;

in that the two securing elements are designed as elongate, substantially symmetrical half shells, the open sides of which are directed toward each other and which jointly form an elongate hollow body approximately in the form of a right-angled parallelepiped;

in that receptacles for the sliding elements are provided on the inner sides of the two half shells;

in that the end edges, which are directed toward each other, of the two half shells abut in alignment against each other, wherein rod recesses of the head support rods are left open on the upper and lower sides of the half shells;

in that the receiving bushing is arranged on the inner side of the first half shell and a box-shaped support for supporting the receiving bushing is provided on the inner side of the second half shell; and/or in that a preferably laterally displaceable and spring-prestressed closure slide is provided which closes the plug-in opening in the receiving bushing, which plug-in opening is arranged on the front side of the first half shell, if no plug element is plugged into the receiving bushing.

Further advantages and refinements of the invention emerge from the description and the attached drawings.

It goes without saying that the features mentioned above and those which have yet to be explained below are usable not only in the respectively stated combinations but also in different combinations or on their own without departing from the scope of the present invention.

BRIEF DESCRIPTION OF THE DRAWINGS

The invention is explained in more detail below using preferred exemplary embodiments with reference to the associated drawings.

DETAILED DESCRIPTION OF THE PREFERRED EMBODIMENTS

Figure 1:
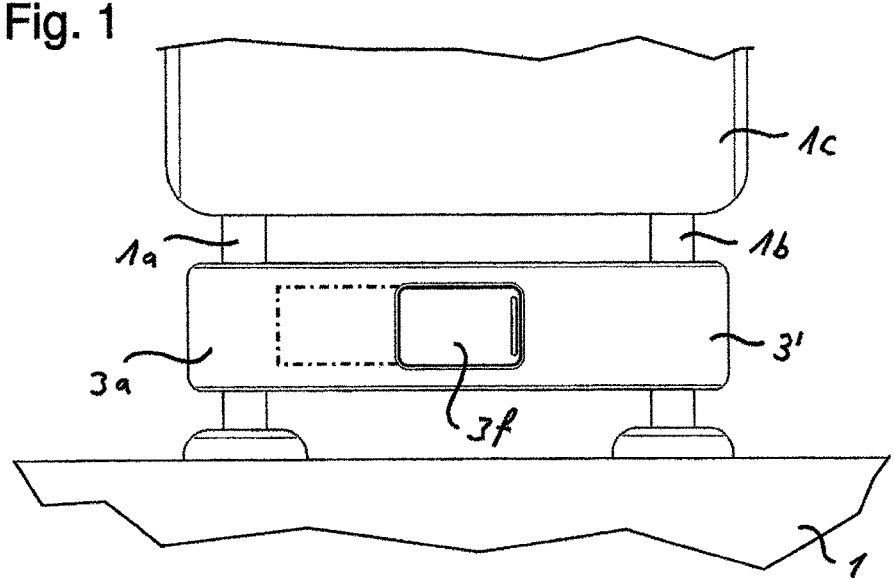
FIG. 1 shows the securing device attached to the two head support rods of a vehicle seat, in a view from behind, with a closure slide for closing the opening in the receiving bushing in the closed position.

FIG. 1 shows the securing device connected to the two head support rods 1a, 1b which connect the backrest of the vehicle seat 1 to the head support 1c.

Figure 2:
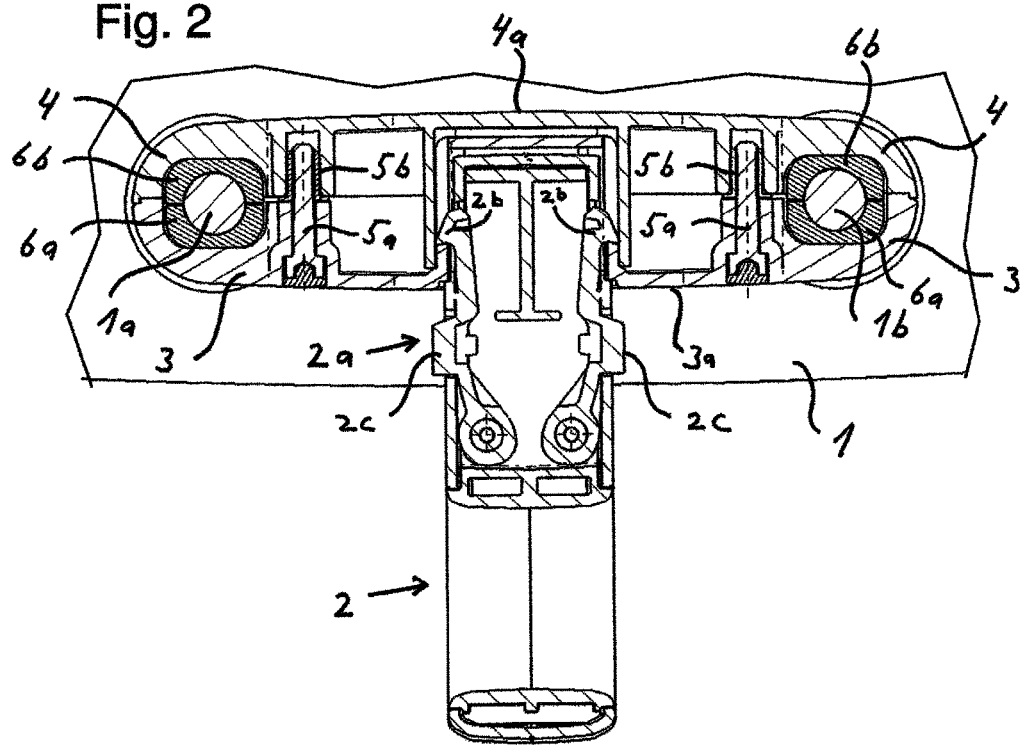
FIG. 2 shows a longitudinal sectional view of the securing device screwed to the two head support rods of a vehicle seat with a device provided with a plug element, plugged-in and locked in the receiving bushing of the securing device.

The first and the second securing elements 3, 4 are arranged on two opposite sides of the head support rods 1a, 1b and protrude laterally over the latter FIG. 2).

Figure 3:
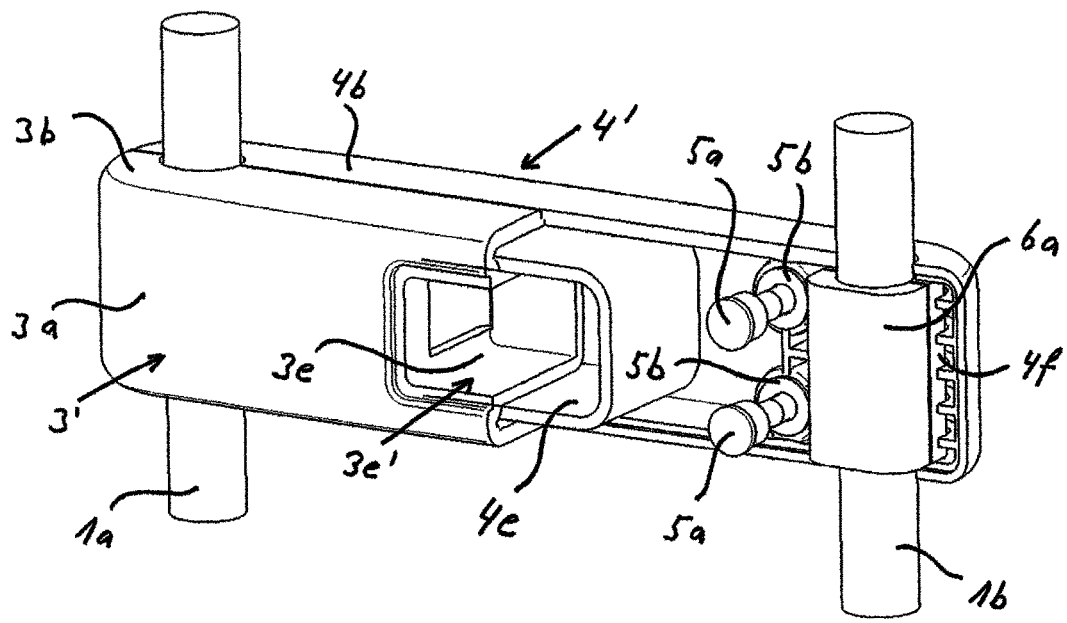
FIG. 3 shows a partially cut-free perspective view of a securing device attached to the two head support rods.

The receiving bushing 3e which forms part of the first securing element 3 and is accommodated in a box-shaped support 4e arranged on the second securing element 4 is arranged centrally between the head support rods 1a, 1b (FIG. 3).

The plug-in opening 3e' in the receiving bushing 3e is aligned with the front side 3a of the first securing element 3 (FIG. 4) and is closed with a laterally displaceable, spring-loaded closure slide 3f (FIG. 1).

The plug element 2a arranged on the device 2 (here in the form of a universal hook for hanging up bags) is, after the closure slide 3f is opened, plugged through the plug-in opening 3e' into the receiving bushing 3e and locked in the receiving bushing 3e by the closure hook 2b. To release the lock, the release buttons 2c arranged laterally on the plug element 2a are pressed and the plug element 2a is pulled with the device 2 out of the receiving bushing 3e (FIG. 2).

In the region of the head support rods 1a, 1b, open receptacles 3g, 4f, in which the sliding elements 6a, 6b are accommodated, are provided on the securing elements 3, 4 against the head support rods 1a, 1b.

Figure 5:
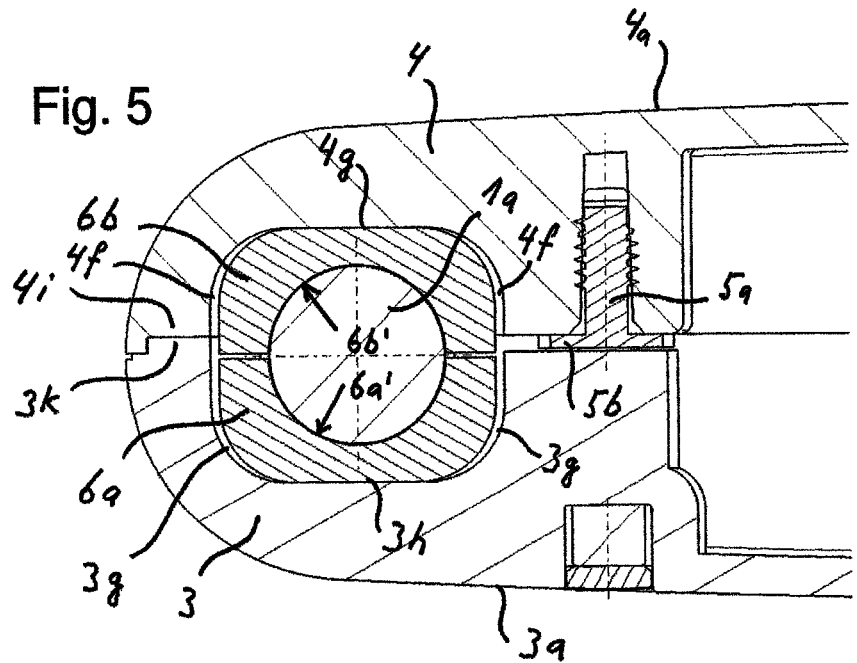
FIG. 5 shows a detailed view of the securing of the securing device to a head support rod, in a longitudinal section.

The sliding surfaces 6a', 6b' of the sliding elements 6a, 6b, which sliding surfaces are directed against the head support rods 1a, 1b, have a semi-circular cross section and make contact with the head support rods 1a, 1b over half of the circumference, and therefore the sliding surfaces 6a', 6b' of in each case two sliding elements 6a, 6b which are directed toward each other jointly surround the head support rods 1a, 1b in a tubular manner (FIG. 5).

The width of the receptacles 3g, 4f is somewhat larger than the width of the sliding elements 6a, 6b, and therefore the latter, guided on the longitudinal guides 3h, 4g, can move laterally parallel to a horizontal connecting line between the head support rods 1a, 1b and can thus compensate for play in the distance between the head support rods 1a, 1b.

On the securing elements 3, 4, screw connections 5a, 5b are provided between the receiving bushing 3e and the receptacles 3g, 4f for the sliding elements 6a, 6b, to which screw connections the first and the second securing elements 3, 4 can be screwed. Instead of screw connections 5a, 5b, latching, snap-in or click connections are also conceivable.

Stops 3k, 4i (FIG. 5) are arranged on both sides of the two securing elements 3, 4 and support the first and the second securing elements 3, 4 against each other during the screwing in such a manner that no forces of the screw connection that could block the running of the sliding elements 6a, 6b on the head support rods 1a, 1b are transmitted to the sliding elements 6a, 6b.

Figure 4:
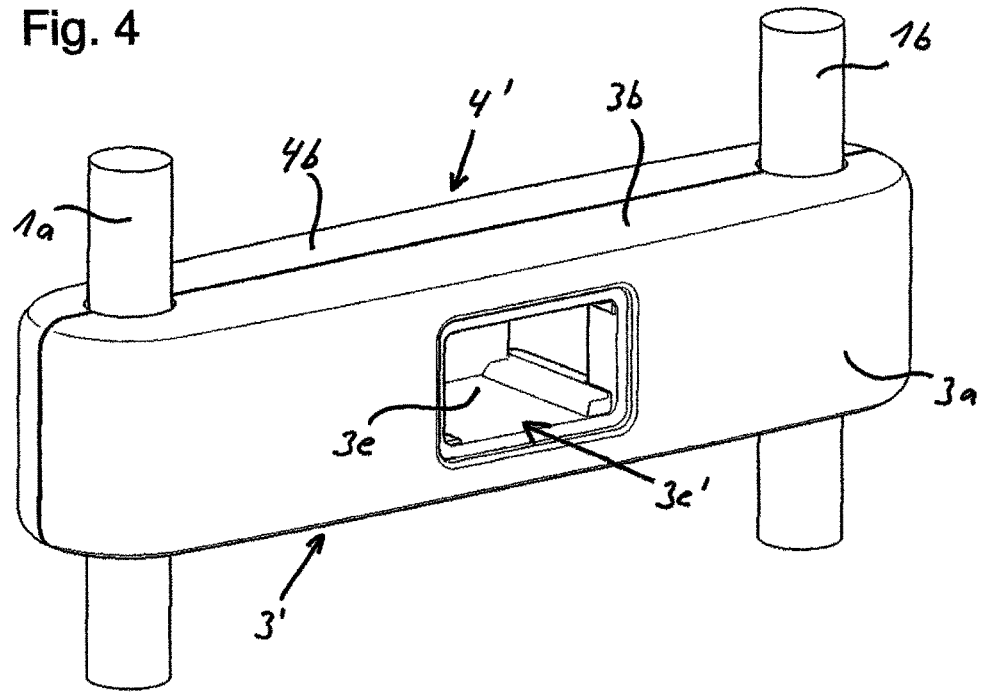
FIG. 4 shows a perspective view of a securing device connected to the two head support rods.
Figure 6:
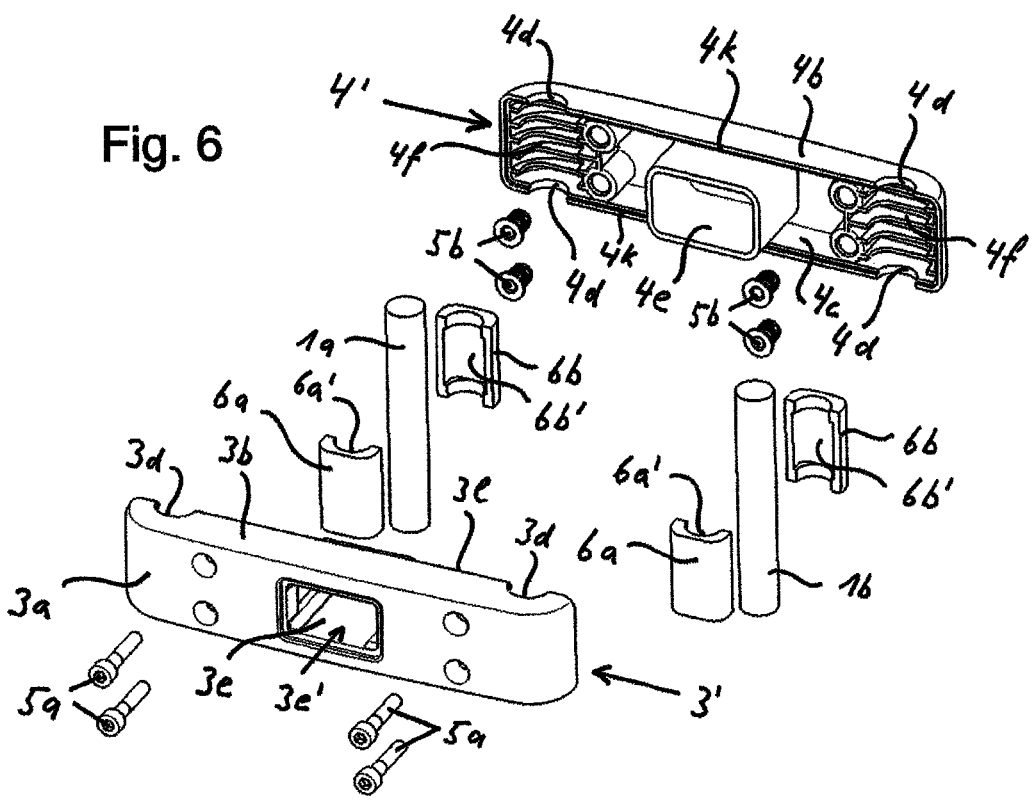
FIG. 6 shows an exploded view of the securing device with two head support rods.

FIGS. 3, 4 and 6 show a further embodiment of the securing device, in which the first and the second securing elements 3, 4 are designed as elongate, substantially symmetrical half shells 3', 4', the open sides of which are directed toward each other and which jointly form an elongate hollow body approximately in the form of a right-angled parallelepiped.

The receptacles 3g, 4f for the sliding elements 6a, 6b and the domes with the inserts 5b for the screw connection are arranged on the inner side of the two half shells 3', 4'.

The receiving bushing 3e is arranged on the inner side of the first half shell 3', and the box-shaped support 4e for supporting the receiving bushing 3e is arranged on the inner side of the second half shell 4' (FIG. 3).

The end edges 3l, 4k, which are directed toward each other, of the screw-connected half shells 3', 4' abut in alignment against each other, wherein rod recesses 3d, 4d for the head support rods 1a, 1b are left open on the upper and lower sides 3b, 3c, 4b, 4c of the half shells 3', 4'.

The invention claimed is:

1. A securing device for removably attaching a device to two mutually spaced apart head support rods, each having a longitudinal axis, of a motor vehicle seat, the device comprising:

a receiving bushing adapted to receive a plug element arranged on the device, a first securing element and a second securing element that secure the receiving bushing on the head support rods, the first securing element and the second securing element separate from one another and on opposite sides relative to a plane defined by head support rods when the securing device is arranged on the head support rods, connecting elements that reciprocally connect the first securing element and the second securing element together, and sliding elements separate from and arranged between the securing elements that are adapted to engage the head support rods, the first securing element comprising a stop and the second securing element comprising a stop, the stops support the first securing element against the second securing element when the first securing element and the second securing element are arranged on the head support rods and connected by the connecting elements, wherein the first securing element and the second securing element provide a holding force acting against the sliding elements and by the holding force, the sliding elements stably connect the securing device to the head support rods while permitting vertical displacement of the securing device, in the direction of the longitudinal axis of the head support rods, and the stops prevent forces beyond the holding force from blocking the vertical displacement of the securing device.

2. The securing device as claimed in claim 1, wherein the first and second securing elements are adapted to extend beyond the head support rods and two of the sliding elements are arranged on each of the securing elements.

3. The securing device as claimed in claim 1, wherein the sliding elements include sliding surfaces that are directed toward the head support rods, and are adapted to engage around the head support rods in sections.

4. The securing device as claimed in claim 3, wherein the sliding surfaces of the sliding elements have a circular-segment-shaped or semi-circular cross section.

5. The securing device as claimed in claim 3, wherein the sliding surfaces of in each case two of the sliding elements, which are directed toward each other are adapted to jointly surround the head support rods in a tubular manner.

6. The securing device as claimed in claim 1, wherein the sliding elements are separate components and are inserted into the securing elements.

7. The securing device as claimed in claim 6, wherein for adaptation to different distances between the head support rods, the sliding elements are mounted in the securing elements so as to be movable parallel to a horizontal connecting line between the two head support rods.

8. The securing device as claimed in claim 7, wherein the sliding elements are guided in longitudinal guides in the securing elements.

9. The securing device as claimed in claim 1, wherein the connecting elements are screw connections.

10. The securing device as claimed in claim 1, wherein the two securing elements are elongate, half shells, having open sides, which are directed toward each other and which jointly form an elongate hollow body.

11. The securing device as claimed in claim 10, wherein the two half shells comprise inner sides having receptacles for the sliding elements.

12. The securing device as claimed in claim 10, wherein end edges, which are directed toward each other, of the two half shells abut in alignment against each other, and rod recesses adapted to the head support rods are left open on upper and lower sides of the half shells.

13. The securing device as claimed in claim 10, wherein the receiving bushing is arranged on an inner side of the first half shell and a box-shaped support for supporting the receiving bushing is provided on an inner side of the second half shell.

14. The securing device as claimed in claim 10, further comprising a laterally displaceable and spring-loaded closure slide, which closes a plug-in opening in the receiving bushing, said plug-in opening is arranged on a front side of the first half shell, if no plug element is plugged into the receiving bushing.

* * * * *